April 5, 1955  B. D. PILE  2,705,762
MAGNETIC COUPLING ASSEMBLY
Filed April 17, 1951  2 Sheets-Sheet 1
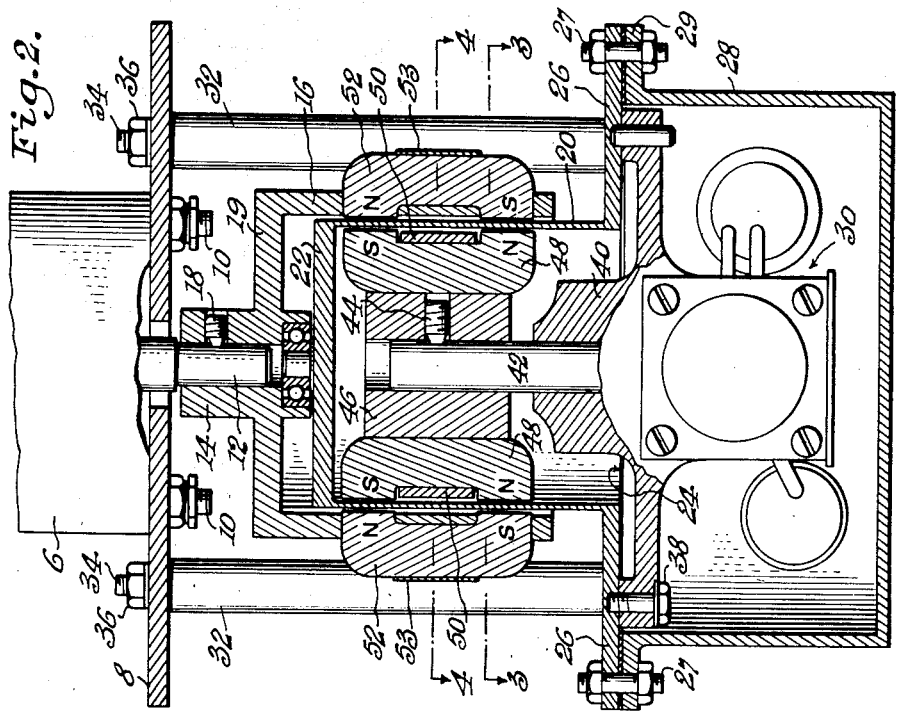
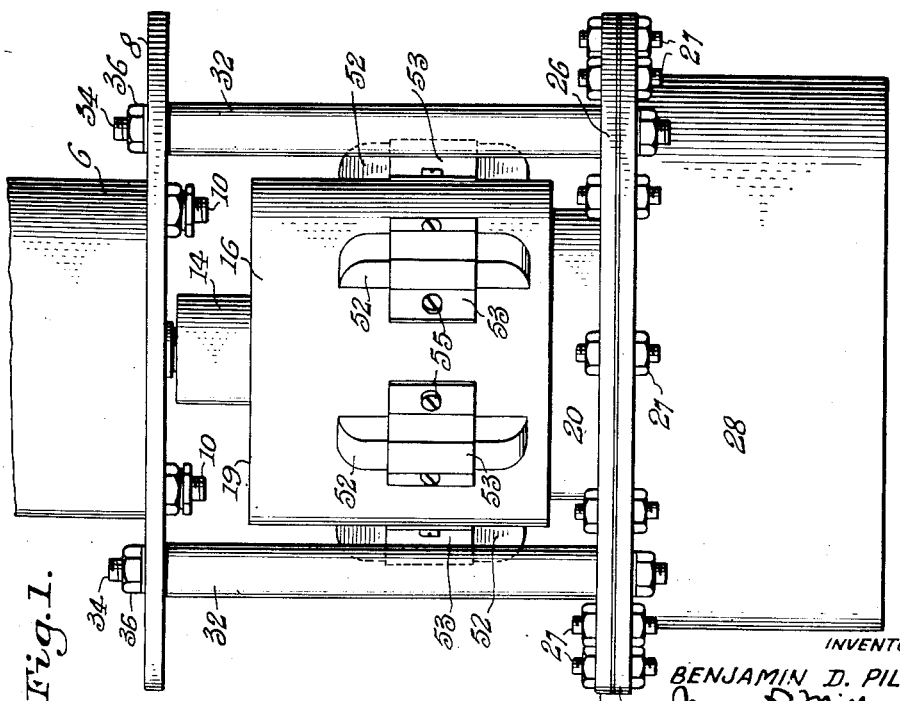
INVENTOR
BENJAMIN D. PILE
BY
ATTORNEYS April 5, 1955  B. D. PILE  2,705,762
MAGNETIC COUPLING ASSEMBLY
Filed April 17, 1951  2 Sheets-Sheet 2
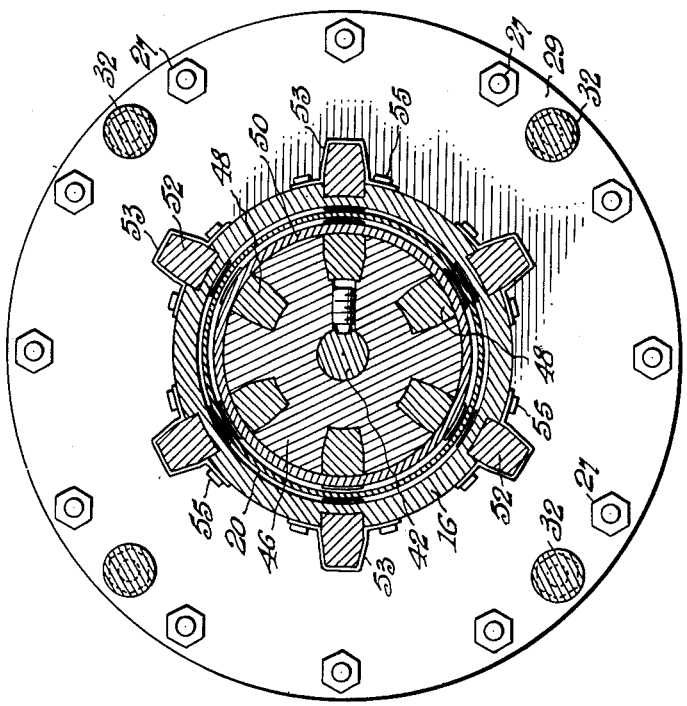
Fig. 4.
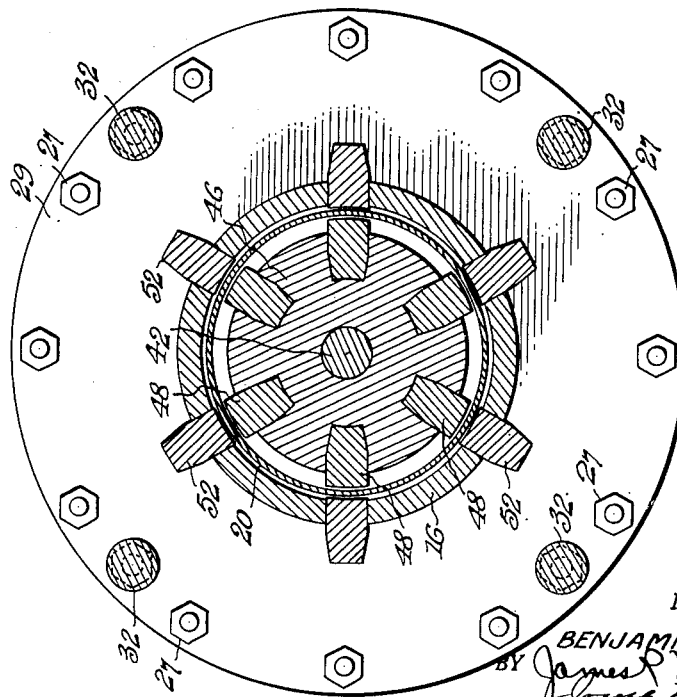
Fig. 3.
INVENTOR.
BENJAMIN D. PILE
BY
ATTORNEYS

United States Patent Office 2,705,762
Patented Apr. 5, 1955

2,705,762

MAGNETIC COUPLING ASSEMBLY

Benjamin D. Pile, New York, N. Y.

Application April 17, 1951, Serial No. 221,495

1 Claim. (Cl. 310—104)

(Granted under Title 35, U. S. Code (1952), sec. 266)

The invention described herein may be manufactured and used by or for the Government for governmental purposes, without payment to me of any royalty thereon.

The present invention relates to a magnetic coupling for transmission of power through a metal seal or housing by mutual attraction of permanent magnets; and the invention is adapted particularly to a mechanism wherein the driven member is enclosed in a sealed metal casing and the driving member is outside the casing, whereby movement of the driving member is transmitted to the enclosed driven member.

More specifically, the present invention relates to an apparatus wherein a compressor for a refrigerating apparatus is enclosed in a hermetically sealed casing and is driven by a motor, mounted outside the casing, through the magnetic coupling of the present invention.

The invention has for one of its objects the provision in such an apparatus, of a highly satisfactory magnetic coupling that will transmit large amounts of power through a housing as compared to the losses in the coupling.

A further object of the invention is to provide a coupling mechanism that is relatively small and compact as compared to the driven or driving member.

A still further object of the invention is to provide for the use of any type of external motor, either D. C. or A. C., in the case of driving hermetically sealed refrigerator compressors. At present, such hermetically sealed refrigerators are limited to the use of A. C. motors only.

A further object of the invention is to provide greater capacity and efficiency in a given compressor by driving the compressor with an external motor, rather than by an enclosed motor in which instance heat losses are added to the refrigerant.

Other objects and advantages of the present construction will become apparent as the description proceeds, and the features of novelty will be pointed out in particularity in the appended claim.

The accompanying drawings show structural details of an illustrative embodiment of the improved magnetic coupling assembly of the present invention, wherein:

Fig. 1 is a side elevation of the improved coupling together with driving and driven elements of the assembly;

Fig. 2 is a fragmentary vertical sectional view through the sealed housing and magnetic coupling of Fig. 1;

Fig. 3 is a transverse sectional elevation taken along the line 3—3 of Fig. 2, looking in the direction of the arrows; and Fig. 4 is a similar view, taken on the line 4—4 of Fig. 2, looking in the direction of the arrows.

Referring more particularly to the drawings, reference numeral 6 indicates any type of driving motor, which is shown as being mounted on a flange-plate 8 or equivalent mounting means, by way of locking screws 10, the motor 6 being shown as having a shaft 12 snugly received in the bore of a tubular connecting hub 14 of a driving member 16 of the magnetic coupling assembly of the present invention. A countersunk locking screw 18 is provided for positive connection between the hub 14 and the shaft 12 of the motor 6. The driving member 16 is a hollow cylinder having a closed end 19 from which the tubular hub 14 is formed. The opposite end of the cylindrical driving member 16 receives a similarly shaped, non-magnetic metal seal 20 having its inner end 22 closed and its opposite end 24 open, the open end 24 being provided with an annular mounting flange 26. This flange 26 is bolted or secured otherwise as shown at 27 to a complemental flange 29 on the compressor housing 28 containing a compressor mechanism 30, this housing 28 being welded or bolted with a gasket to form a hermetic seal with the mounting flange 26. Also, the motor mounting means 8 is secured to this sealing flange 26 and to the housing 28 by spaced tie rods 32 having upper threaded ends 34 secured by lock nuts 36. The compressor mechanism 30 also is connected to the flange 26 by suitable screws or the like 38 and is provided with a drive shaft assembly comprising a hub 40 which receives a shaft 42, to which shaft is attached, by screws 44 or the like, a driven member 46, composed of aluminum or other non-magnetic material into which a series of permanent magnets 48 are mounted and arranged so that their pole faces of like polarity are all at the same end of the driven member 46. The magnets 48 are secured in position by a non-magnetic ring 50. It will be seen from the drawings, and particularly from Fig. 2, that a hermetic seal exists between the driving member 16 and the driven member 46 of the magnetic coupling assembly.

Mounted on the outer periphery of the driving member 16 are permanent magnets 52 which are secured in place by retaining brackets 53 secured by screws 55, and which, like the magnets 48, are arranged so that pole faces of like polarity are at the same end of the driving member 16, but of opposite polarity to the magnets 48 of the driven member 46 when in the assembled position, this arrangement providing for magnetic attraction between each adjacent pair of pole faces of the magnets 48 and 52, of which there are twelve illustrated in the drawing, there being shown six magnets in each series. This arrangement precludes the possibility of like poles opposing each other, and thus reducing the field strength of the magnets, regardless of the relative position of driven member 46 with reference to the driving member 16. In instances of overload, the coupling merely releases with the torque dropping to substantially zero, thereby precluding the possibility of damage either to the coupling, the motor, or to the compressor. It is to be noted also that upon rotation of the driving and driven members, any given point on the casing, in the path of the pole faces, is subject to magnetic lines of force flowing in one direction only. This, therefore, reduces the losses due to eddy currents being induced in the housing to a minimum.

In the operation of the coupling, as the driving member 16 rotates, an angular displacement occurs between the series of magnets 48 and 52, the amount of which depends upon the load on the driven member. The attracting force between the pole faces then is no longer radial in direction, but at some acute angle with the radial force. This force then is composed of a radial component and of a tangential component, the latter of which imparts motion to the driven member.

By way of example, it has been found in practice that by utilizing magnets weighing a total of 1.8 pounds on a mean diameter of three inches between pole faces with a pole gap of 0.060 inch, a maximum torque of 400 inch-ounces can be transmitted. Such an application provides for a housing of approximately 0.05-inch wall thickness between the pole faces of the coupling members. It is obvious that a housing made of stainless steel, for example, is entirely adequate to withstand relatively high pressures such as are encountered in refrigeration apparatus.

While the invention herein illustrated and described represents a typical and preferred illustrative embodiment of the improved coupling assembly of the present invention, it will be apparent that various structural modifications of the specifically illustrated embodiment of the construction may be made without departing from the inventive concept; and, accordingly, it will be understood that it is intended and desired to embrace within the invention such modifications and changes as may be necessary to adapt it to varying conditions and uses, as defined by the appended claim.

What I claim as new and wish to secure by Letters Patent is:

A magnetic coupling assembly for inter-connecting a motor and compressor mechanism which comprises, in combination, a cup-shaped non-magnetic driving member adjustably connected to the motor, a non-magnetic shield mounted concentrically within the cup-shaped driving member, means hermetically sealing the shield to the compressor mechanism, a non-magnetic driven member rotatably mounted within the shield in parallel axial relation with said driving member and adjustably connected to the compressor mechanism, said driving member being formed with a series of circumferentially mutually spaced apertures extending in aligned parallel relation with the axis of rotation of said driving member, a first series of permanent magnets mounted in circumferentially spaced relation on the driving member with pole faces of like polarity disposed at the same end of the series and driving member, said magnets being disposed with their longitudinal axes paralleling the axis of rotation of the driving member and having their pole faces projecting through said apertures, a series of longitudinal slots circumferentially arranged in said driven member and extending parallel to the axis thereof, a second series of permanent magnets arranged peripherally of the driven member with their longitudinal axes paralleling those of the first series of magnets, each magnet of said second series of magnets being located in one of said longitudinal slots, said second series of magnets being arranged so that pole faces of like polarity are disposed at the same end of the series and at the same end of the driven member with the pole faces projecting outwardly of said slots, the pole faces of said second series of magnets being of opposite polarity to the pole faces of the magnets in the driving member and mutually spaced therefrom, a ring of non-magnetic material circumferentially arranged about said driven member and passing between the pole faces projecting outwardly of said slots for securing said second series of magnets in fixed position in said slots whereby, upon rotation of said driving member, the pole faces of said first series of magnets are caused to travel in a fixed path aligned with the pole faces of said second series of magnets, the magnetic path between the driving and driven members comprising saturated magnetic material producing maximum torque for a given amount of magnetic material, said driving member upon rotation producing an angular displacement between said first and second series of permanent magnets to effect the production of attracting forces between said first and second series of permanent magnets to provide synchronous operation between said driving and said driven members, said attracting forces composed of radial components and tangential components acting upon said driven magnets to impart motion to said driven member until overload conditions reduce the speed of the driven members and the torque of the coupling to substantially zero.

References Cited in the file of this patent

UNITED STATES PATENTS

| | | |
|---|---|---|
| 1,911,960 | Lipman | May 30, 1933 |
| 2,248,030 | Zwack | July 1, 1941 |
| 2,437,871 | Wood | May 16, 1948 |
| 2,463,409 | Moody | Mar. 1, 1949 |

FOREIGN PATENTS

| | | |
|---|---|---|
| 272,364 | Switzerland | Mar. 16, 1951 |
| 592,048 | France | Apr. 23, 1925 |